United States Patent
Bremer et al.

(10) Patent No.: US 12,448,790 B2
(45) Date of Patent: Oct. 21, 2025

(54) TRANSITION MOLDING WITH FLEXIBLE HINGES

(71) Applicant: Zamma Corporation, Inc., Orange, VA (US)

(72) Inventors: William Bremer, Savannah, GA (US); Nicholas D. Buser, Richmond, VA (US); Christopher Ketibian Norris, Greensboro, NC (US)

(73) Assignee: Zamma Corporation, Inc., Orange, VA (US)

( * ) Notice: Subject to any disclaimer, the term of this patent is extended or adjusted under 35 U.S.C. 154(b) by 134 days.

(21) Appl. No.: 18/466,245

(22) Filed: Sep. 13, 2023

(65) Prior Publication Data

US 2023/0417069 A1    Dec. 28, 2023

Related U.S. Application Data

(63) Continuation-in-part of application No. 17/406,282, filed on Aug. 19, 2021, now Pat. No. 12,006,703, which is a continuation of application No. 17/073,732, filed on Oct. 19, 2020, now Pat. No. 11,124,975.

(60) Provisional application No. 63/376,514, filed on Sep. 21, 2022, provisional application No. 63/041,209, filed on Jun. 19, 2020.

(51) Int. Cl.
| | |
|---|---|
| E04F 19/06 | (2006.01) |
| B29C 48/12 | (2019.01) |
| B29C 48/21 | (2019.01) |
| B29K 27/06 | (2006.01) |
| B29L 31/00 | (2006.01) |

(52) U.S. Cl.
CPC ............ *E04F 19/066* (2013.01); *B29C 48/12* (2019.02); *B29C 48/21* (2019.02); *B29K 2027/06* (2013.01); *B29K 2995/007* (2013.01); *B29L 2031/003* (2013.01)

(58) Field of Classification Search
CPC ...... E04F 19/066; E04F 19/062; B29C 48/12; B29L 2031/003
See application file for complete search history.

(56) References Cited

U.S. PATENT DOCUMENTS

| | | | |
|---|---|---|---|
| 5,657,598 A | 8/1997 | Wilbs et al. | |
| 6,345,480 B1 | 2/2002 | Kemper et al. | |
| 6,550,192 B1 | 4/2003 | Nelson et al. | |

(Continued)

FOREIGN PATENT DOCUMENTS

| | | |
|---|---|---|
| EP | 1042571 B1 | 4/2004 |
| EP | 2141304 A1 | 1/2010 |

(Continued)

*Primary Examiner* — Patrick J Maestri
(74) *Attorney, Agent, or Firm* — Goodwin Procter LLP (57) ABSTRACT

A variety of molding profiles and related methods of manufacturing and installing the molding profiles are described. An example molding includes: an extruded profile of unitary construction including: a substantially planar central portion; at least one downwardly depending substantially planar wing; at least one hinge section joining the at least one wing to the central portion; and a pair of vertical legs depending from a bottom surface of the central portion, wherein the central portion, the at least one wing, and the vertical legs are formed of a first material, wherein the at least one hinge section is formed of a second material, and wherein the second material is more flexible than the first material.

20 Claims, 11 Drawing Sheets

(56) References Cited

U.S. PATENT DOCUMENTS

| | | |
|---|---|---|
| 6,588,165 B1 | 7/2003 | Wright |
| 2006/0207198 A1 | 9/2006 | Sondermann |

FOREIGN PATENT DOCUMENTS

| | | |
|---|---|---|
| WO | WO-2013041797 A1 | 3/2013 |
| WO | WO-2014128609 A1 | 8/2014 |
| WO | WO-2014102518 A3 | 6/2015 |

TRANSITION MOLDING WITH FLEXIBLE HINGES

CROSS-REFERENCE TO RELATED APPLICATIONS

This application claims the benefit of U.S. Provisional Patent Application No. 63/376,514, filed Sep. 21, 2022, and is a continuation-in-part of U.S. patent application Ser. No. 17/406,282, filed Aug. 19, 2021, which is a continuation of U.S. patent application Ser. No. 17/073,732, filed Oct. 19, 2020, which claims the benefit of U.S. Provisional Patent Application No. 63/041,209, filed Jun. 19, 2020, the entire contents of each of which are incorporated by reference herein.

TECHNICAL FIELD

In general, the subject matter of this disclosure relates to molding profiles and, in certain examples, to a universal transition molding configured for mounting in a slot or gap between adjacent building materials, such as flooring materials.

BACKGROUND

Transition molding can be used to provide a smooth transition between two adjacent flooring materials, particularly when there is a noticeable gap or height difference between the flooring materials. By covering abrupt or unfinished edges between flooring materials, transition molding can reduce potential safety hazards and improve appearance of a floor installation. Existing transition molding products, however, can be challenging to install and/or cannot adequately accommodate a variety of height transitions.

A long standing problem in the residential and commercial construction industry relates to floor transitions of different heights requiring a "multiple transition" molding, as well as floors of the same height requiring an "even transition" molding. These transitions can occur between the same or different flooring materials (e.g., wood to wood, wood to tile, tile to linoleum, etc.). Currently, the industry addresses this problem by supplying two separate products: a T-molding for same height flooring transitions and an MPR (multi-purpose reducer) molding for different floor height transitions.

Multiple profiles of both T- and MPR moldings are manufactured, to accommodate vastly different thicknesses of floors. This entails purchasing and maintaining an inventory of a large number of similar, but differently dimensioned, moldings.

There is a need for a universal transition molding that is easy to install and capable of accommodating a wide range of height transitions between adjacent flooring materials.

SUMMARY OF THE INVENTION

Embodiments of the articles and methods described herein relate to a universal transition molding for bridging two floor surfaces or materials. The universal transition molding can be formed by extrusion and can be or include a molding profile of unitary construction. The universal transition molding can be installed by pressing or pounding a portion of the molding into a gap or slot between the two floor surfaces. In some instances, vertical legs on the molding can be pressed into the slot, which can include or be defined by a U-shaped track configured to receive the vertical legs. In other examples, the articles and methods described herein relate to an end molding or a stair nose.

In general, in one aspect, the subject matter of this disclosure relates to a universal transition molding for bridging two floor surfaces. The molding is or includes a substantially symmetrical extruded profile of unitary construction including: a substantially planar central portion; a pair of downwardly depending substantially planar wings; a pair of hinge sections joining the wings to opposing edges of the central portion; and a pair of vertical legs depending from a bottom surface of the central portion.

In certain examples, the extruded profile is made of or includes PVC and/or can have a Shore D durometer in a range of about 50 to about 90. The central portion can have a width in a range of about 7 mm to about 20 mm. The central portion can have a thickness in a range of about 1 mm to about 2 mm. Each wing can have a width in a range of about 7 mm to about 20 mm. Each wing can have a thickness in a range of about 1 mm to about 3 mm. Each wing can have a thickness greater than a thickness of the central portion. Each hinge section can have a thickness in a range of about 0.5 mm to about 1.5 mm. Each hinge section can have a thickness less than a thickness of at least one of the central portion or each wing. Each hinge section can have a thickness less than a thickness of each of the central portion and each wing. Each leg can have a height in a range of about 5 mm to about 10 mm. Each leg can have a thickness in a range of about 2 mm to about 4 mm. Each leg can include a plurality of friction barbs protruding from a side thereof proximate a respective wing. The molding can include a cover extending along upper surfaces of the central portion and the wings. The cover can be adhered to at least a portion of the upper surfaces. The cover can include a decorative finish, a friction enhancing finish, a wear resistant finish, or any combination thereof. The molding can further include a U-shaped track defining a slot for receiving the vertical legs therein. The U-shaped track can include means for attaching a base of the U-shaped track to a surface. The attaching means can be or include an adhesive layer, a plurality of apertures formed in the base for receiving fasteners therethrough, or any combination thereof.

In another aspect, the subject matter of this disclosure relates to a method of manufacturing a universal transition molding for bridging two floor surfaces. The method includes the steps of: (i) extruding a substantially symmetrical molding profile of unitary construction having: a substantially planar central portion; a pair of downwardly depending substantially planar wings; a pair of hinge sections joining the wings to opposing edges of the central portion; and a pair of vertical legs depending from a bottom surface of the central portion; and (ii) cooling the extruded profile.

In some implementations, the extruded profile is made of or includes PVC and/or can have a Shore D durometer in a range of about 50 to about 90. The central portion can have a width in a range of about 7 mm to about 20 mm. The central portion can have a thickness in a range of about 1 mm to about 2 mm. Each wing can have a width in a range of about 7 mm to about 20 mm. Each wing can have a thickness in a range of about 1 mm to about 3 mm. Each wing can have a thickness greater than a thickness of the central portion. Each hinge section can have a thickness in a range of about 0.5 to about 1.5 mm. Each hinge section can have a thickness less than a thickness of at least one of the central portion or each wing. Each hinge section can have a thickness less than a thickness of each of the central portion and each wing. Each leg can have a height in a range of about 5 mm to about 10 mm. Each leg can have a thickness in a range of about 2 mm to about 4 mm. Each leg can include a plurality of friction barbs protruding from a side thereof proximate a respective wing. The method can include applying a cover extending along upper surfaces of the central portion and the wings. Applying the cover can include co-extruding, coating, and/or adhering the cover onto at least a portion of the upper surfaces. The cover can include a decorative finish, a friction enhancing finish, a wear resistant finish, or any combination thereof. The method can include providing a U-shaped track defining a slot for receiving the vertical legs therein. The U-shaped track can include means for attaching a base of the U-shaped track to a surface. The attaching means can be or include an adhesive layer, a plurality of apertures formed in the base for receiving fasteners therethrough, or any combination thereof.

In another aspect, the subject matter of this disclosure relates to a method of installing a universal transition molding for bridging two floor surfaces. The method includes the steps of: (i) obtaining a substantially symmetrical molding profile of unitary construction having: a substantially planar central portion; a pair of downwardly depending substantially planar wings; a pair of hinge sections joining the wings to opposing edges of the central portion; and a pair of vertical legs depending from a bottom surface of the central portion; and (ii) pressing the legs into a slot between the two floor surfaces.

In various examples, the slot is formed by a saw kerf, opposing edges of flooring, a U-shaped track mounted between the two floor surfaces, or any combination thereof. The extruded profile can be made of or include PVC and/or can have a Shore D durometer in a range of about 50 to about 90. The central portion can have a width in a range of about 7 mm to about mm. The central portion can have a thickness in a range of about 1 mm to about 2 mm. Each wing can have a width in a range of about 7 mm to about 20 mm. Each wing can have a thickness in a range of about 1 mm to about 3 mm. Each wing can have a thickness greater than a thickness of the central portion. Each hinge section can have a thickness in a range of about to about 1.5 mm. Each hinge section can have a thickness less than a thickness of at least one of the central portion or each wing. Each hinge section can have a thickness less than a thickness of each of the central portion and each wing. Each leg can have a height in a range of about 5 mm to about 10 mm. Each leg can have a thickness in a range of about 2 mm to about 4 mm. Each leg can include a plurality of friction barbs protruding from a side thereof proximate a respective wing. The molding profile can have or include a cover extending along upper surfaces of the central portion and the wings. The cover can be adhered to at least a portion of the upper surfaces. The cover can include a decorative finish, a friction enhancing finish, a wear resistant finish, or any combination thereof. The method can include mounting a U-shaped track between the two floor surfaces, and pressing the legs into the slot can include inserting the legs into the U-shaped track. Mounting the U-shaped track can include attaching the U-shaped track to a surface using at least one of an adhesive layer and a mechanical fastener.

In another aspect, the subject matter of this disclosure relates to a molding. The molding includes: an extruded profile of unitary construction including: a substantially planar central portion; at least one downwardly depending substantially planar wing; at least one hinge section joining the at least one wing to the central portion; and a pair of vertical legs depending from a bottom surface of the central portion, wherein the central portion, the at least one wing, and the vertical legs are formed of a first material (e.g., a rigid material), wherein the at least one hinge section is formed of a second material (e.g., a flexible material), and wherein the second material is more flexible than the first material.

In certain examples, the first material has a Shore D durometer from about 70 to about and the second material has a Shore A durometer from about 70 to about 90. A modulus of elasticity of the second material can be less than a modulus of elasticity of the first material. The first material and the second material can each include polyvinyl chloride. The first material and the second material can enable the at least one wing to rotate as a rigid body about the at least one hinge section when a force is applied to a tip of the at least one wing. The at least one wing can have a thickness greater than a thickness of the central portion. The at least one hinge section can have a thickness less than a thickness of at least one of the central portion or the at least one wing. The molding can be substantially symmetrical and configured for bridging two floor surfaces, wherein the at least one wing includes a pair of downwardly depending substantially planar wings, and wherein the at least one hinge section includes a pair of hinge sections joining the pair of wings to opposing edges of the central portion. Alternatively or additionally, the extruded profile can form a stair nose or an end molding. The vertical legs can be adapted to be received in a slot. In some examples, the molding can further include a cover extending along upper surfaces of the central portion and the at least one wing, wherein the cover includes at least one of a decorative finish, a friction enhancing finish, or a wear resistant finish.

In another aspect, the subject matter of this disclosure relates to a method of manufacturing a molding. The method includes the steps of: co-extruding a profile of unitary construction including: a substantially planar central portion; at least one downwardly depending substantially planar wing; at least one hinge section joining the at least one wing to the central portion; and a pair of vertical legs depending from a bottom surface of the central portion, wherein the central portion, the at least one wing, and the vertical legs are formed of a first material, wherein the at least one hinge section is formed of a second material, and wherein the second material is more flexible than the first material.

In some implementations, the coextruding includes: extruding the central portion, the at least one wing, and the pair of vertical legs using the first material; and extruding the at least one hinge section using the second material. The coextruding can include merging a melt stream of the first material with a melt stream of the second material. The method can include applying a cover extending along upper surfaces of the central portion and the at least one wing, wherein applying the cover includes at least one of co-extruding, coating, or adhering the cover onto at least a portion of the upper surfaces.

In another aspect, the subject matter of this disclosure relates to a method of installing a molding. The method includes the steps of: obtaining an extruded profile of unitary construction including: a substantially planar central portion; at least one downwardly depending substantially planar wing; at least one hinge section joining the at least one wing to the central portion; and a pair of vertical legs depending from a bottom surface of the central portion, wherein the central portion, the at least one wing, and the vertical legs are formed of a first material, wherein the at least one hinge section is formed of a second material, and wherein the second material is more flexible than the first material; and pressing the legs into a slot. In certain examples, the slot is formed by at least one of a saw kerf, opposing edges of flooring, a U-shaped track, or a combination thereof.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art and are considered to be within the scope of the disclosed invention.

It should be understood that the order of steps or order for performing certain actions is immaterial, so long as the invention remains operable. Moreover, two or more steps or actions may be conducted simultaneously.

Figure 1:
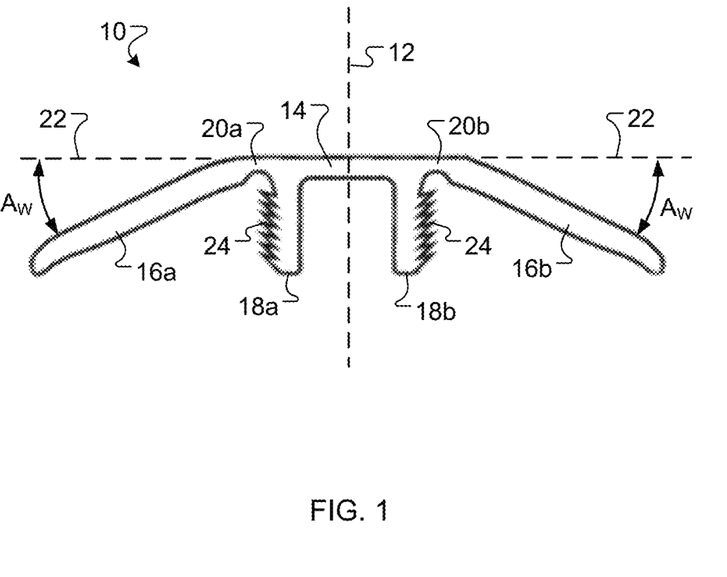
FIG. 1 is a schematic, end view of a universal transition molding profile, in accordance with certain embodiments of the invention.

Referring to FIG. 1, in certain examples, a universal transition molding 10 (also referred to herein simply as "molding") is configured to be installed or mounted in a slot between two adjacent building materials, such as two adjacent flooring, wall, or ceiling materials, to provide a smooth or more gradual transition between the adjacent building materials, which can have different heights or thicknesses. The molding 10 can be symmetrical or substantially symmetrical about a central vertical plane 12. As used herein, substantially symmetrical can mean visually symmetrical. Accordingly, dimensional variations of up to 25%, 20%, 15%, 10% or 5% or less between corresponding structures can be considered substantially symmetrical. The molding 10 can be or include a profile that can be formed by extrusion, molding, or other manufacturing methods. In some embodiments, the molding 10 or a portion thereof (e.g., an extruded profile) is of unitary construction, for example, with elements of the molding 10 formed from a single, continuous material, a blend of materials (e.g., a homogeneous blend), or multiple co-extruded materials. The molding 10 can be formed from or include a polymeric material, such as polyvinyl chloride (PVC), polypropylene, polyethylene, polyester, nylon, an elastomer, a thermoplastic elastomer (TPE), or other polymeric materials. A durometer (e.g., Shore D) of the material used in the molding 10 can be about 60 or can range from about 50 to about 90, though values above and below this range are contemplated. Optionally, the material can include fillers or reinforcing materials, such as glass fiber or carbon fiber, to enhance structural integrity.

In the depicted example, the universal transition molding 10 includes a central portion 14, a pair of wings 16a and 16b, and a pair of vertical legs 18a and 18b. The central portion 14 is or includes a planar or substantially planar (or flat) sheet or strip portion of the molding 10. Each wing 16a or 16b is also planar or substantially planar (or flat). As used herein, substantially planar can mean visually planar. For example, a surface can be substantially planar along a length dimension when a radius of curvature for the length dimension (e.g., in a direction normal to the surface) is at least 2, 3, 5, or 10 times larger than the length dimension (e.g., a length dimension of 1 cm has a radius of curvature of at least 2, 3, 5, or cm). The wings 16a and 16b are joined to opposing edges of the central portion 14 by a pair of respective hinge sections 20a and 20b. When the molding 10 is in a relaxed or uninstalled state, the wings 16a and 16b depend or hang slightly downwardly from the central portion 14, to define a wing angle Aw between each wing 16a or 16b and a horizontal plane 22 defined by the central portion 14. This feature provides a resilient bias, so that the tips of the wings 16a and 16b reliably remain in contact with the abutting floor surfaces after installation of the molding 10. The hinge sections 20a and 20b are generally more flexible than the wings 16a and 16b and/or the central portion 14, such that the hinge sections 20a and 20b permit the wings 16a and 16b to flex or rotate about the hinge sections 20a and 20b relative to the central portion 14, thereby changing the wing angle Aw. The greater flexibility of the hinge sections 20a and 20b can be achieved by making the hinge sections 20a and 20b thinner than the wings 16a and 16b and/or the central portion 14. The thinner hinge sections 20a and 20b can be achieved by forming an inner radius at a bottom surface of each hinge section 20a or 20b. The pair of vertical legs 18a and 18b extend from a bottom surface of the central portion 14, proximate the hinge sections 20a and 20b. Each vertical leg 18a or 18b can include one or more friction barbs 24 protruding from an inner and/or outer side of the vertical leg 18a or 18b.

Figure 2:
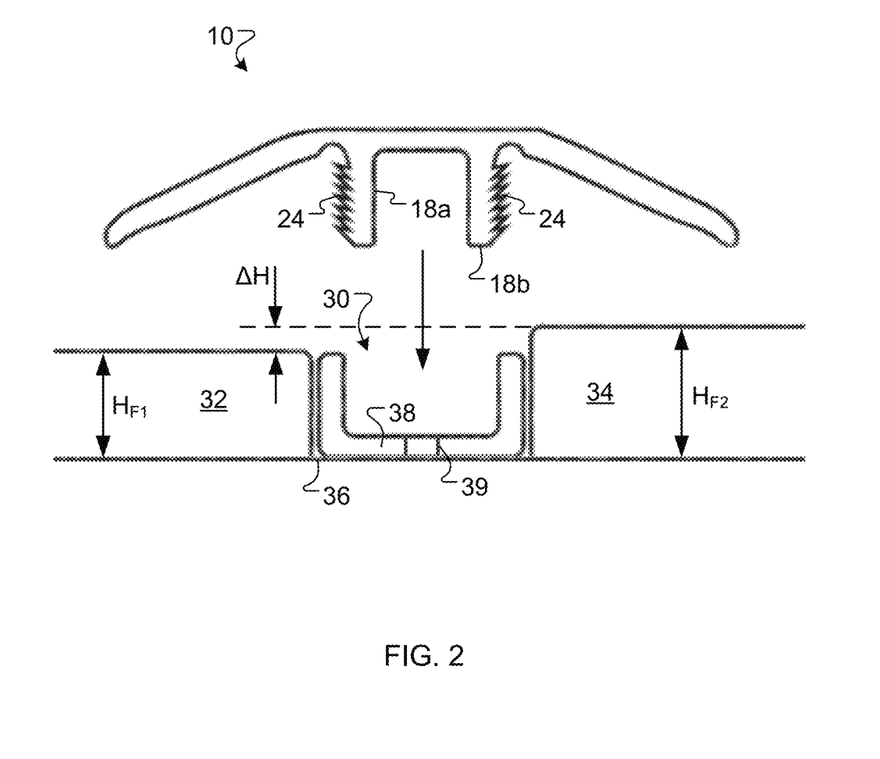
FIG. 2 is a schematic, end view of a universal transition molding profile and a mating U-shaped track mounted in a slot between two adjacent flooring materials, in accordance with certain embodiments of the invention.

Referring to FIG. 2, the molding 10 can be installed in a gap or slot 30 between two adjacent flooring materials, including a first flooring material 32 and a second flooring material 34. The first flooring material 32 and the second flooring material 34 can have different thicknesses or heights ($H_{F1}$ and $H_{F2}$, respectively) above a sub-floor 36, such that a height difference ΔH exists between exposed upper surfaces of the two flooring materials 32 and 34. To facilitate installation, a U-shaped track 38 can be mounted to the sub-floor 36 in the slot 30 (e.g., using adhesive or fasteners through apertures 39 in the U-shaped track 38) and can be sized and configured to receive the vertical legs 18a and 18b of the molding 10. For example, the vertical legs 18a and 18b can be pressed into the U-shaped track 38 during installation, to achieve a friction or interference fit between outer walls or barbs 24 of the vertical legs 18a and 18b and inner vertical wall surfaces of the U-shaped track 38. The friction barbs 24 can provide enhanced friction between the vertical legs 18a and 18b and the U-shaped track 38, to ensure the molding 10 is properly secured and retained in the U-shaped track 38. In alternative examples, the molding 10 can be installed without the U-shaped track 38 by achieving a friction or interference fit directly with sidewalls of the adjacent flooring materials 32 and 34. Installation can be achieved by pressing or pounding the molding 10 into position by hand or with a mallet.

Figure 3:
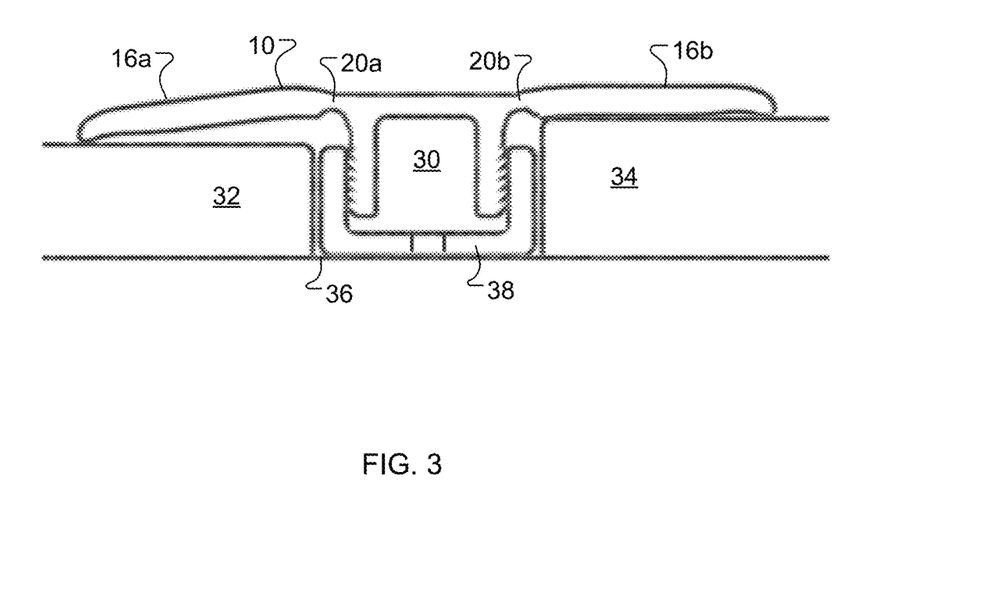
FIG. 3 is a schematic, end view of a universal transition molding profile installed in a mating U-shaped track and bridging two adjacent flooring materials of different heights, in accordance with certain embodiments of the invention.

FIG. 3 depicts the molding 10, the U-shaped track 38, and the two flooring materials 32 and 34 after the molding 10 has been installed. Advantageously, the flexibility and downward bias afforded by the hinge sections 20a and 20b permits the two wings 16a and 16b to rotate about the hinge sections 20a and 20b, as needed, to accommodate the difference in height between the two flooring materials 32 and 34, while maintaining reliable contact with the flooring materials 32 and 34. In the installed position, each wing 16a or 16b remains planar or substantially planar and is resting on an adjacent flooring material 32 or 34, with little or no gap or separation between at least a tip of the wing 16a or 16b and the flooring material 32 or 34. The installed molding fills the slot 30 between the two flooring materials 32 and 34 and provides a smooth transition from the first flooring material 32 to the second flooring material 34.

Figure 4:
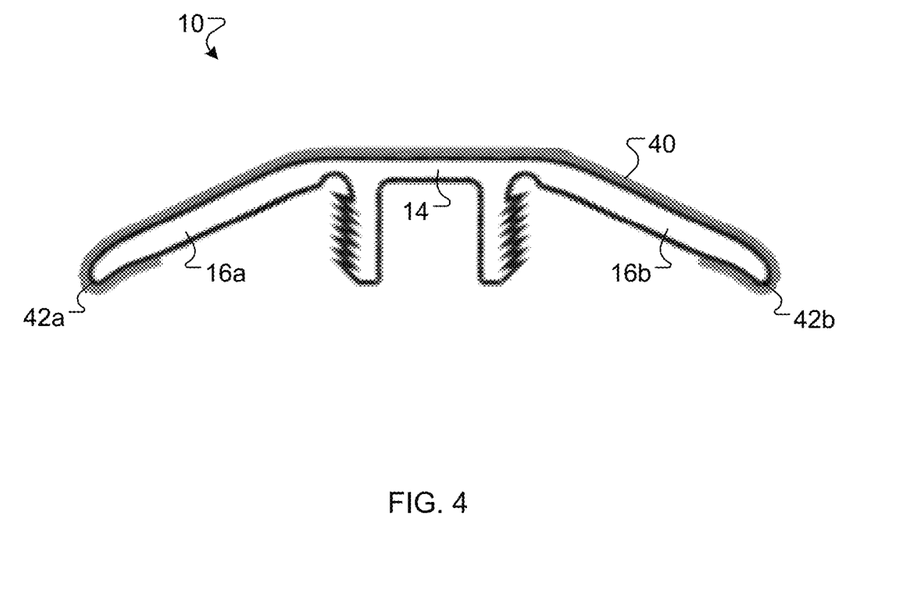
FIG. 4 is a schematic, end view of a universal transition molding profile having a cover, in accordance with certain embodiments of the invention.

Referring to FIG. 4, in some examples, the molding 10 can have or include a cover 40 extending along upper surfaces of the central portion 14 and the wings 16a and 16b. In the depicted example, the cover 40 extends around outer tips 42a and 42b of the wings 16a and 16b and covers at least a portion of bottom surfaces of the wings 16a and 16b, so as to be reliably retained and/or visually appealing. The cover 40 can be or include, for example, a coating (e.g., paint or stain), a film, a foil, or a laminate material. The cover 40 can be formed on the molding through co-extrusion, in which the cover 40 is co-extruded onto the depicted portion of the profile of the extruded molding 10. Alternatively or additionally, the cover 40 can be applied or adhered to the molding 10 after the profile of the molding 10 has been formed. The cover 40 can have or provide a decorative finish, a friction enhancing finish, and/or a wear resistant finish. In some instances, the decorative finish can achieve an appearance of a natural building material, such as wood or stone, through the use of one or more pigments and/or a printed pattern.

Figure 5:
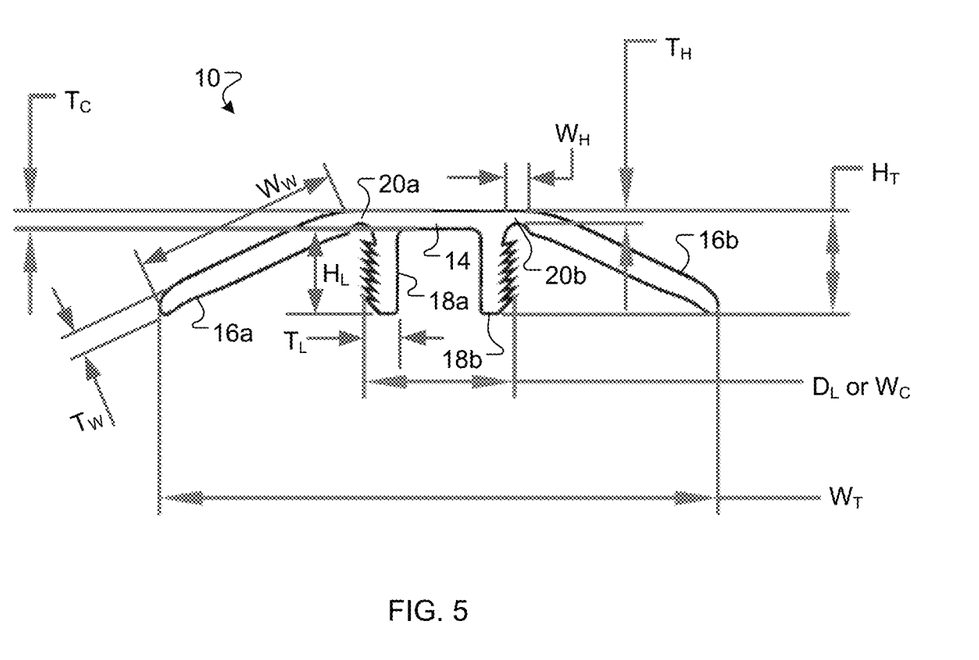
FIG. 5 is a schematic, end view of a universal transition molding profile with various labelled dimensions, in accordance with certain embodiments of the invention.

FIG. 5 illustrates various dimensions for this embodiment of the molding 10, including a thickness $T_C$ of the central portion 14, a width $W_C$ of the central portion 14, a thickness $T_W$ of each wing 16a or 16b, a width $W_W$ of each wing 16a or 16b, a thickness $T_H$ of the hinge sections, a width W H of the hinge sections, a thickness $T_L$ of each vertical leg 18a or 18b, a height $H_L$ of each vertical leg 18a or 18b, a total height $H_T$ of the molding 10 (e.g., in its relaxed or uninstalled state), a total width W T of the molding 10 (e.g., in its relaxed or uninstalled state), and a distance $D_L$ between outer sides of the vertical legs 18a and 18b, which can be equal to or substantially the same as (e.g., within 5%, 10%, or 20%) the width $W_C$ of the central portion 14. The total height H T can be equal to a distance from a top surface of the central portion 14 to a bottom surface of the vertical legs 18a and 18b. Example low, high, and typical range values for these dimensions and other parameters for the molding 10 are provided in Table 1. The listed values for thicknesses $T_C$, $T_H$, $T_L$, and/or $T_W$ can be minimum, maximum, or average thicknesses. Various embodiments include any parameter value (e.g., integer or decimal value) within the cited ranges. For example, the thickness $T_C$ of the central portion 14 can be 1, 1.1, 1.2, . . . , 1.9, or 2 mm. Likewise, the width W H of each hinge section can be 1, 2, 3, . . . , 7, or 8 mm. Express support and written description of these parameter values for each parameter are hereby represented.

TABLE 1

Exemplary parameters for the universal transition molding.

| Parameter | Low | Typical | High |
| --- | --- | --- | --- |
| Central Portion Thickness $T_C$ (mm) | 1 | 1.2-1.4 | 2 |
| Central Portion Width $W_C$ (mm) | 7 | 13-14 | 20 |
| Wing Thickness $T_W$ (mm) | 1 | 1.6-2 | 3 |
| Wing Width $W_W$ (mm) | 7 | 13-14 | 20 |
| Hinge Section Thickness $T_H$ (mm) | 0.5 | 1-1.1 | 1.5 |
| Hinge Section Width $W_H$ (mm) | 1 | 2-4 | 8 |
| Leg Thickness $T_L$ (mm) | 2 | 2.7-3 | 4 |
| Leg Height $H_L$ (mm) | 5 | 6.5-7 | 10 |
| Total Height $H_T$ (mm) | 5 | 8-10 | 15 |
| Total Width $W_T$ (mm) | 25 | 40-50 | 75 |
| Vertical Leg Distance $D_L$ (mm) | 8 | 12-13 | 20 |
| Molding Durometer (Shore D) | 50 | 60 | 90 |
| Wing Angle $A_W$ (degrees) | 15 | 25-35 | 45 |
| Height Difference ΔH (mm) | 0 | 8-10 | 20 |

Figure 6:
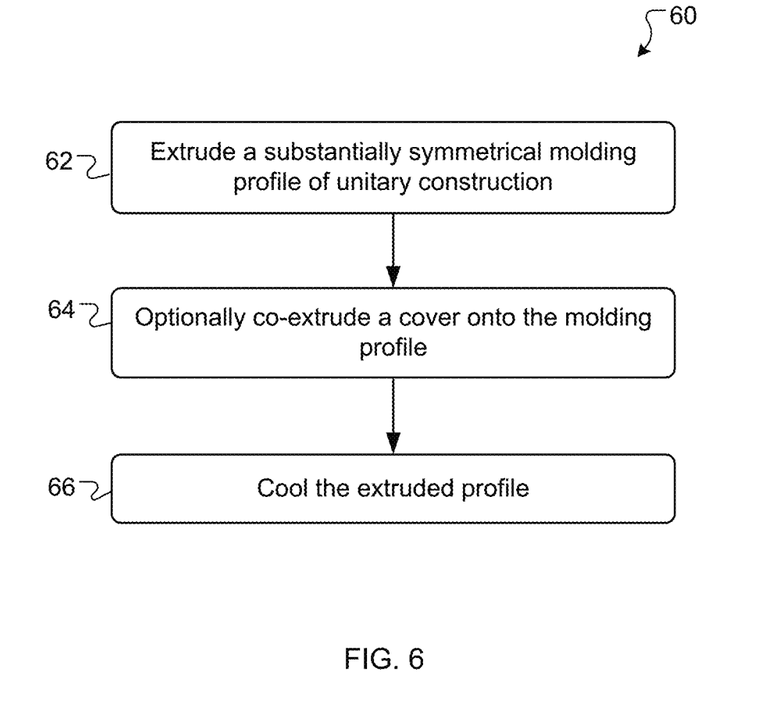
FIG. 6 is a flowchart of a method of manufacturing a universal transition molding, in accordance with certain embodiments of the invention.

FIG. 6 is a flowchart of a method 60 of manufacturing a universal transition molding (e.g., for bridging two floor surfaces) in accordance with certain embodiments of the invention. A substantially symmetrical molding profile of unitary construction is extruded (step 62). The molding profile includes: a substantially planar central portion; a pair of downwardly depending (e.g., hanging) substantially planar wings; a pair of hinge sections joining the wings to opposing edges of the central portion; and a pair of vertical legs depending from a bottom surface of the central portion. A cover is optionally co-extruded (step 64), coated, and/or adhered onto at least a portion of the molding profile. The cover can provide a decorative finish, a friction enhancing finish, or a wear resistant finish to the molding profile, as described herein. The extruded profile is cooled (step 66) and can be cut to desired lengths for shipping and installation. In other examples, the method 60 can be modified to form extruded profiles that are not symmetric and/or are formed of a rigid material and a flexible material, as described herein. For example, the extrusion step 62 can involve co-extruding a profile using a rigid material to form one or more portions of the profile (e.g., a wing, a center portion, a leg, and/or a body portion) and a flexible material to form one or more other portions of the profile (e.g., a hinge section).

Figure 7:
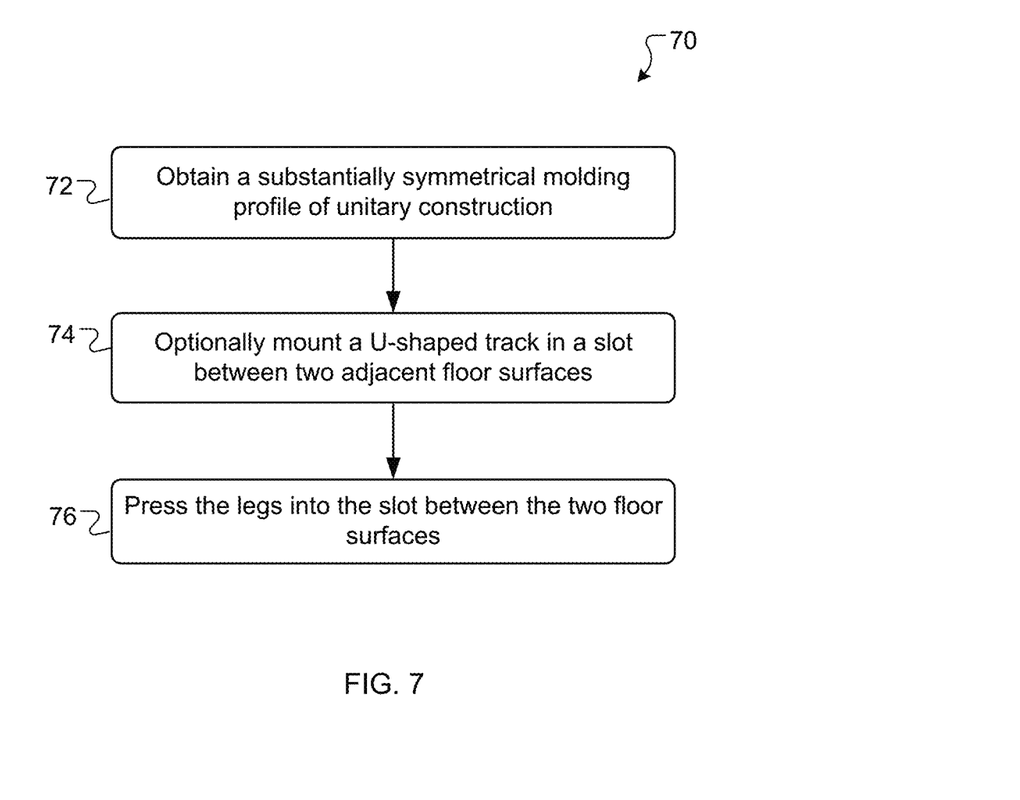
FIG. 7 is a flowchart of a method of installing a universal transition molding, in accordance with certain embodiments of the invention.

FIG. 7 is a flowchart of a method 70 of installing a universal transition molding (e.g., for bridging two floor surfaces) in accordance with certain embodiments of the invention. A substantially symmetrical molding profile of unitary construction is obtained (step 72). The molding profile includes: a substantially planar central portion; a pair of downwardly depending substantially planar wings; a pair of hinge sections joining the wings to opposing edges of the central portion; and a pair of vertical legs depending from a bottom surface of the central portion. A U-shaped track can optionally be mounted (step 74) in a slot or gap between two floor surfaces. The legs are pressed (step 76) into the slot (e.g., the U-shaped track). In other examples, the method 70 can be used and/or modified to install extruded profiles that are not symmetric and/or that have a rigid material and a flexible material, as described herein.

Figure 8:
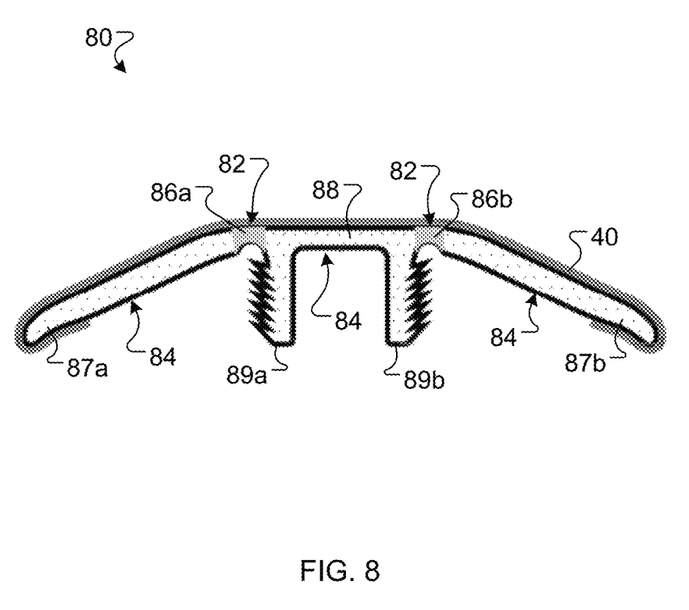
FIG. 8 is a schematic, end view of a universal transition molding profile, in accordance with certain embodiments of the invention.

Referring to FIG. 8, in certain implementations, a universal transition molding 80 can include a flexible material 82 and a rigid material 84. The flexible material 82 can be located within hinge sections 86a and 86b of the molding 80, and the rigid material 84 can be located within other portions of the molding 80, including wings 87a and 87b, a central portion 88, and/or vertical legs 89a and 89b. In some examples, each of the flexible material 82 and the rigid material 84 can be or include polyvinyl chloride (PVC), polyethylene, polypropylene, polyester, polyurethane, a foam material (e.g., closed cell), and/or other suitable material(s). The universal transition molding 80 can have a shape and size that are similar or identical to a shape and size for the universal transition molding 10. For example, the dimensions of the universal transition molding 80 can be equal to or consistent with the dimensions listed in Table 1. In various examples, the rigid material 84 is referred to herein as a "first material," and the flexible material 82 is referred to herein as a "second material."

Example material properties for the flexible material 82 and the rigid material 84 are presented in Table 2, below. In some implementations, a durometer for the flexible material 82 can range from about 60 Shore A to about 100 Shore A, or from about 70 Shore A to about 90 Shore A, or can be about 80 Shore A (e.g., at a temperature from about 21° C. to about 25° C.). Additionally or alternatively, a durometer for the rigid material 84 can range from about 70 Shore D to about 90 Shore D, or can be about 80 Shore D (e.g., at a temperature from about 21° C. to about 25° C.). In certain examples, a stiffness or modulus of elasticity for the flexible material 82 can be less than a stiffness or modulus of elasticity for the rigid material 84, such that the flexible material 82 is more flexible than the rigid material 84. For example, the modulus of elasticity for the flexible material 82 can be less than or equal to about 50%, about 10%, about 5%, about 1%, about 0.5%, about 0.1%, about 0.05% or about 0.01% of the modulus of elasticity for the rigid material 84.

TABLE 2

Exemplary parameters for universal transition molding having flexible and rigid materials.

| Properties | Rigid Material Standard | Flexible Material Option-A | Flexible Material Option-B |
|---|---|---|---|
| Durometer Hardness ASTM D2240 - Shore | 80D | 70A | 90A |
| Specific Gravity ASTM D792 - g/cm³ | 1.45 | 1.30 | 1.40 |
| Tensile Strength ASTM D412 - PSI | 5000 to 9000 | 2,200 | 2,800 |
| Elongation ASTM D412 - % | 25 to 80 | 400 | 280 |

The universal transition molding 80 can be manufactured using a variety of techniques. In some examples, the universal transition molding 80 can be manufactured by coextrusion in which the flexible material 82 is extruded at the hinge sections 86a and 86b and the rigid material 84 is extruded at one or more other portions (e.g., the wings 87a and 87b, the central portion 88, and/or the vertical legs 89a and 89b). During the coextrusion process, a melt stream of the flexible material 82 can be merged or combined with a melt stream of the rigid material 84. The melt streams can be combined upstream or near an exit of an extrusion die, which can define one or more openings corresponding to a profile of the universal transition molding 80. For example, the melt stream of the flexible material 82 can be directed toward regions of the extrusion die corresponding to the hinge sections 86a and 86b, and the melt stream of the rigid material 84 can be directed toward other regions of the extrusion die. Alternatively or additionally, in some examples, the universal transition molding 80 can be manufactured using molding or 3D printing techniques. In each case, the resulting universal transition molding can be or include a single, unitary part that includes the flexible material 82 and the rigid material 84.

While the flexible material 82 is generally located in the hinge sections 86a and 86b and the rigid material 84 is generally located in other portions, it is understood that there may be some mixing of the two materials. This can result in a transition zone between the two materials, such that the transition zone can include the flexible material 82 on one side, the rigid material 84 on an opposite side, and a mixture of the two materials between the two sides, which can be separated by a short distance (e.g., less than 1 mm, 2 mm, or 5 mm). The transition zone can include a concentration gradient for each material, which can range from 100% of the material on one side to 0% of the material on the opposite side. Such mixing can improve bonding between the two materials. Alternatively or additionally, in some examples there can be an abrupt transition from the flexible material 82 to the rigid material 84, with little or no mixing of the two materials and/or a small or nonexistent transition zone.

Compared to other universal transitional moldings, the universal transition molding has several advantages. For example, the universal transition molding 80 can provide better flexibility and range for the hinge sections 86a and 86b to flex or adapt to a given application, with little or no deformation (e.g., visible deformation) occurring in other portions of the universal transition molding 80 (e.g., the wings 87a and 87b, the central portion 88, or the vertical legs 89a and 89b). For example, when a force or torque is applied to a tip or other portion of one of the wings 87a or 87b, the wing 87a or 87b may be able to rotate about its respective hinge as a rigid body (e.g., with little or no visible deformation of the wing 87a or 87b). The universal transition molding 80 can also achieve cost savings, given that recycled, rigid PVC materials can be used for the wings 87a and 87b, the central portion 88, and/or the legs 89a and 89b, which is where the bulk of the materials are located. Use of the more expensive, flexible material 82 can be limited to the hinge sections 86a and 86b, which can occupy a small portion of a total volume of the universal transition molding 80. Additionally or alternatively, use of rigid PVC materials throughout most of the universal transition molding 80 (e.g., other than in the hinge sections 86a and 86b) can improve thermal stability. Such rigid materials can be able to withstand loads and/or minimize deformation over a wide range of temperatures (e.g., 0-100° F.).

Figure 9:
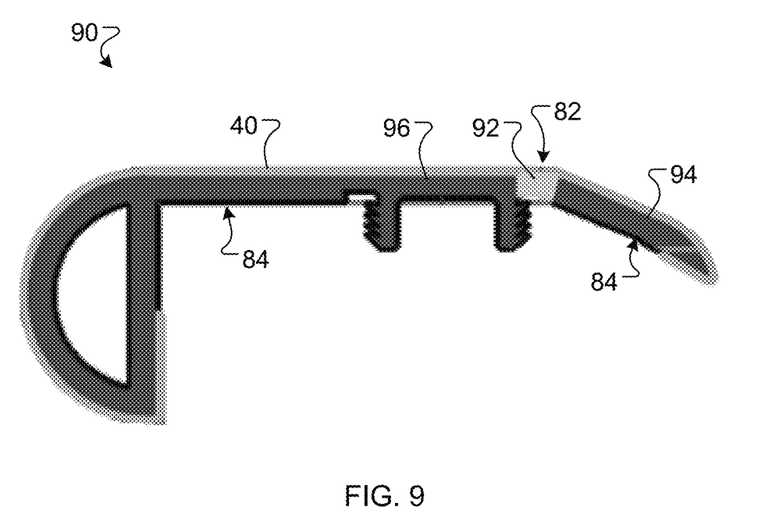
FIG. 9 is a schematic, end view of a small stair nose profile, in accordance with certain embodiments of the invention.
Figure 10:
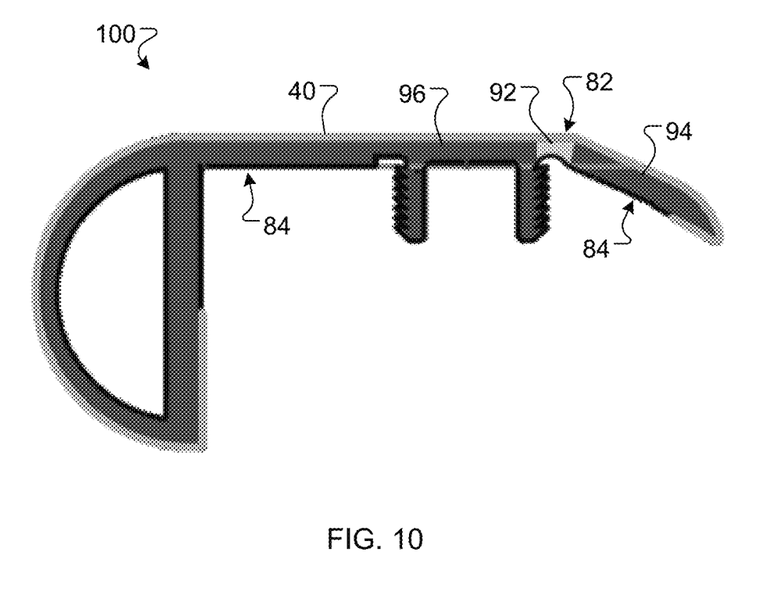
FIG. 10 is a schematic, end view of a medium stair nose profile, in accordance with certain embodiments of the invention.
Figure 11:
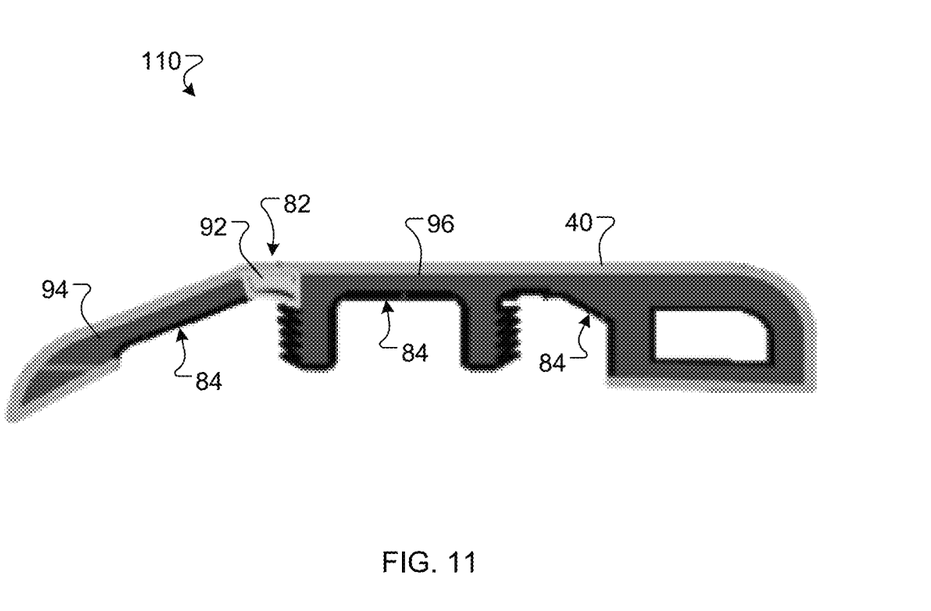
FIG. 11 is a schematic, end view of a small end molding profile, in accordance with certain embodiments of the invention.
Figure 12:
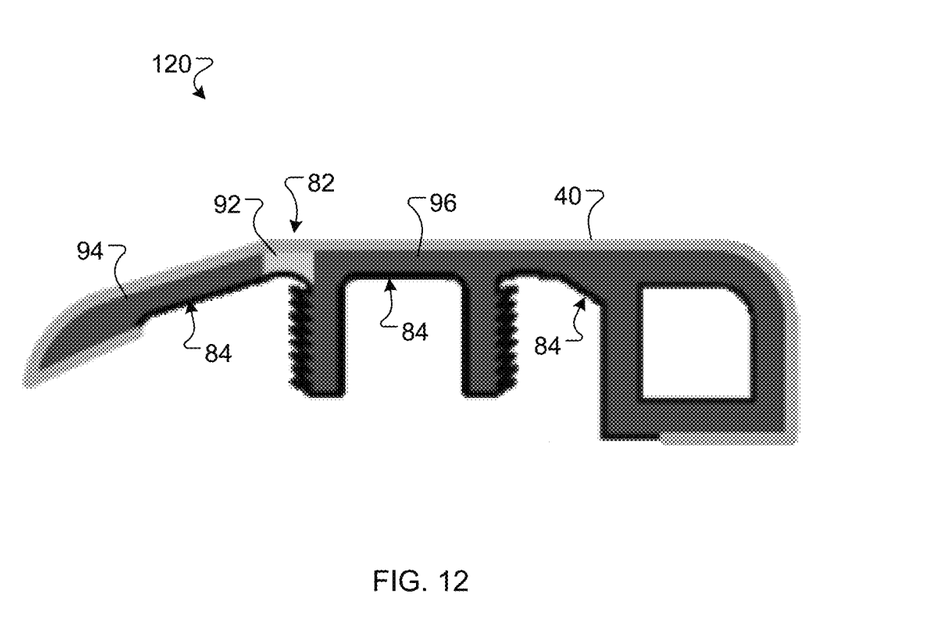
FIG. 12 is a schematic, end view of a medium end molding profile, in accordance with certain embodiments of the invention.
Figure 13:
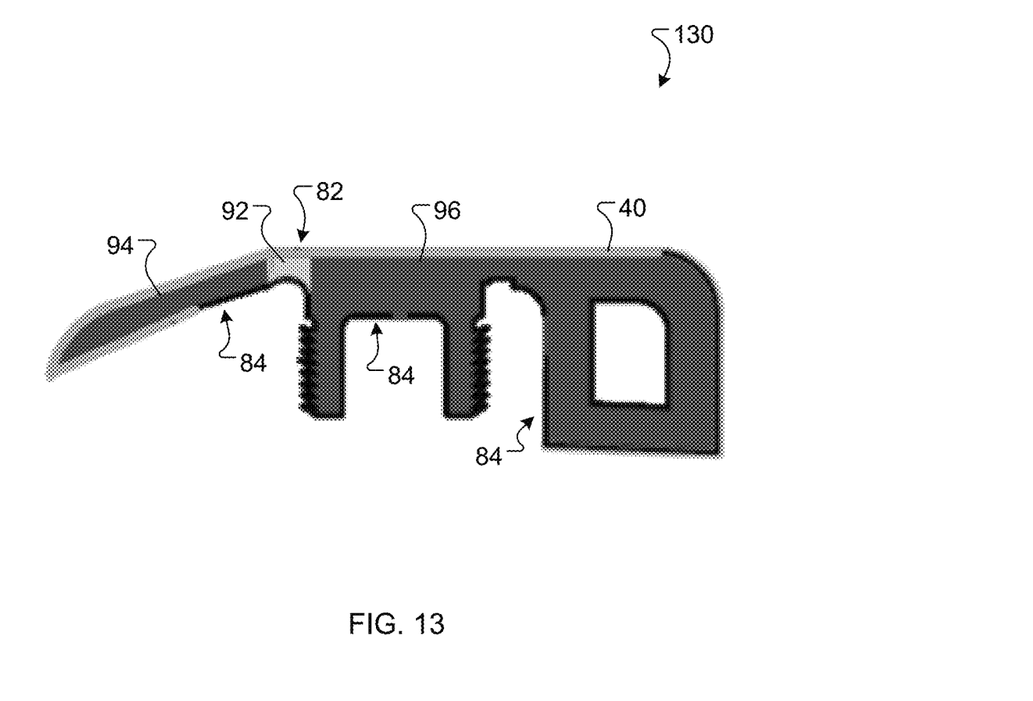
FIG. 13 is a schematic, end view of a large end molding profile, in accordance with certain embodiments of the invention.

FIGS. 9-13 are schematic diagrams of other profiles or moldings that can be formed using the flexible material 82 and the rigid material 84. FIGS. 9 and 10 depict a small stair nose and a medium stair nose 100, respectively. The stair noses 90 and 100 can be used to form a nose for a stair and can provide a transition from the nose to an adjacent flooring or stair tread material (e.g., wood or vinyl). FIGS. 11, 12, and 13 depict a small end molding 110, a medium end molding 120, and a large end molding 130, respectively. The end moldings 110, 120, and 130 can be used to transition from one flooring material (e.g., wood or vinyl) to a different flooring material (e.g., carpet, concrete, or ceramic tile). Other profile shapes are contemplated.

In each of the examples depicted in FIGS. 9-13, the flexible material 82 can be included in a hinge section 92 and the rigid material 84 can be included in one or more other portions (e.g., all remaining portions) of the profile or molding 90, 100, 110, 120, or 130. For example, the hinge section 92 can be formed of the flexible material 82 and can connect a wing 94 with a body or central portion 96 (e.g., containing vertical legs) formed of the rigid material 84. The flexible material 82 can allow the hinge section 92 to bend or flex while the rigid material 84 can prevent such bending or flexing in the wing 94 or other portions of the profile or molding 90, 100, 110, 120, or 130.

Like the universal transition molding 80, each of the profiles or moldings 90, 100, 110, 120, or 130 can be of unitary construction and/or can be manufactured by coextrusion, 3D printing, or other techniques. The profiles or moldings 90, 100, 110, 120, and 130 can include the cover 40 over at least a portion of an outer surface, including one or more portions that are visible after the profiles or moldings 90, 100, 110, 120, and 130 have been installed. Each of the profiles or moldings 90, 100, 110, 120, or 130 can include a single wing 94 and/or can be asymmetric.

In various implementations, any of the profiles or moldings 90, 100, 110, 120, and 130 can have dimensions that are equal to or consistent with corresponding dimensions for the universal transition moldings 10 and 80, described herein. For example, each molding 90, 100, 110, 120, or 130 can have a central portion thickness, a central portion width, a wing thickness, a wing width, a hinge section thickness, a hinge section width, a leg thickness, a leg height, a total height, a total width, a vertical leg distance, and/or a wing angle as listed in Table 1.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. For example, the molding may include solely one vertical mounting leg, with no barbs or barbs formed on one or both sidewalls. Alternatively, for the two leg embodiment, the barbs may be formed on one or both inner opposing sidewalls, to friction grip a vertical protrusion centrally or otherwise located in the slot or gap. Yet further, the barbs may be formed on both inner and outer sidewalls of the two leg embodiment, to optionally be mountable in slots or gaps with correspondingly spaced sidewalls and/or protrusions.

The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A molding comprising:
    an extruded profile of unitary construction comprising:
        a substantially planar central portion;
        at least one downwardly depending substantially planar wing;
        at least one hinge section joining the at least one wing to the central portion; and
        a pair of vertical legs depending from a bottom surface of the central portion,
            wherein the central portion, the at least one wing, and the vertical legs are formed of a first material,
            wherein the at least one hinge section is formed of a second material, and
            wherein the second material is more flexible than the first material.

2. The molding of claim 1, wherein the first material comprises a Shore D durometer from about 70 to about 90, and wherein the second material comprises a Shore A durometer from about 70 to about 90.

3. The molding of claim 1, wherein a modulus of elasticity of the second material is less than a modulus of elasticity of the first material.

4. The molding of claim 1, wherein the first material and the second material each comprises polyvinyl chloride.

5. The molding of claim 1, wherein the first material and the second material enable the at least one wing to rotate as a rigid body about the at least one hinge section when a force is applied to a tip of the at least one wing.

6. The molding of claim 1, wherein the at least one wing has a thickness greater than a thickness of the central portion.

7. The molding of claim 1, wherein the at least one hinge section has a thickness less than a thickness of at least one of the central portion or the at least one wing.

8. The molding of claim 1, wherein the molding is substantially symmetrical and configured for bridging two floor surfaces, wherein the at least one wing comprises a pair of downwardly depending substantially planar wings, and wherein the at least one hinge section comprises a pair of hinge sections joining the pair of wings to opposing edges of the central portion.

9. The molding of claim 1, wherein the extruded profile forms a stair nose or an end molding.

10. The molding of claim 1, wherein the vertical legs are adapted to be received in a slot.

11. The molding of claim 1, further comprising a cover extending along upper surfaces of the central portion and the at least one wing, wherein the cover comprises at least one of a decorative finish, a friction enhancing finish, or a wear resistant finish.

12. A method of manufacturing a molding, the method comprising the steps of:
co-extruding a profile of unitary construction comprising:
a substantially planar central portion;
at least one downwardly depending substantially planar wing;
at least one hinge section joining the at least one wing to the central portion; and
a pair of vertical legs depending from a bottom surface of the central portion,
wherein the central portion, the at least one wing, and the vertical legs are formed of a first material,
wherein the at least one hinge section is formed of a second material, and
wherein the second material is more flexible than the first material.

13. The method of claim 12, wherein the coextruding comprises:
extruding the central portion, the at least one wing, and the pair of vertical legs using the first material; and
extruding the at least one hinge section using the second material.

14. The method of claim 12, wherein coextruding comprises merging a melt stream of the first material with a melt stream of the second material.

15. The method of claim 12, wherein the first material comprises a Shore D durometer from about 70 to about 90, and wherein the second material comprises a Shore A durometer from about 70 to about 90.

16. The method of claim 12, wherein a modulus of elasticity of the second material is less than a modulus of elasticity of the first material.

17. The method of claim 12, wherein the first material and the second material each comprises polyvinyl chloride.

18. The method of claim 12, further comprising applying a cover extending along upper surfaces of the central portion and the at least one wing, wherein applying the cover comprises at least one of co-extruding, coating, or adhering the cover onto at least a portion of the upper surfaces.

19. A method of installing a molding, the method comprising the steps of:
obtaining an extruded profile of unitary construction comprising:
a substantially planar central portion;
at least one downwardly depending substantially planar wing;
at least one hinge section joining the at least one wing to the central portion; and
a pair of vertical legs depending from a bottom surface of the central portion,
wherein the central portion, the at least one wing, and the vertical legs are formed of a first material,
wherein the at least one hinge section is formed of a second material, and
wherein the second material is more flexible than the first material; and
pressing the legs into a slot.

20. The method of claim 19, wherein the slot is formed by at least one of a saw kerf, opposing edges of flooring, a U-shaped track, or a combination thereof.

* * * * *